(No Model.)
A. H. EDDY.
ELECTRIC MEASURING INSTRUMENT.
No. 391,592. Patented Oct. 23, 1888.
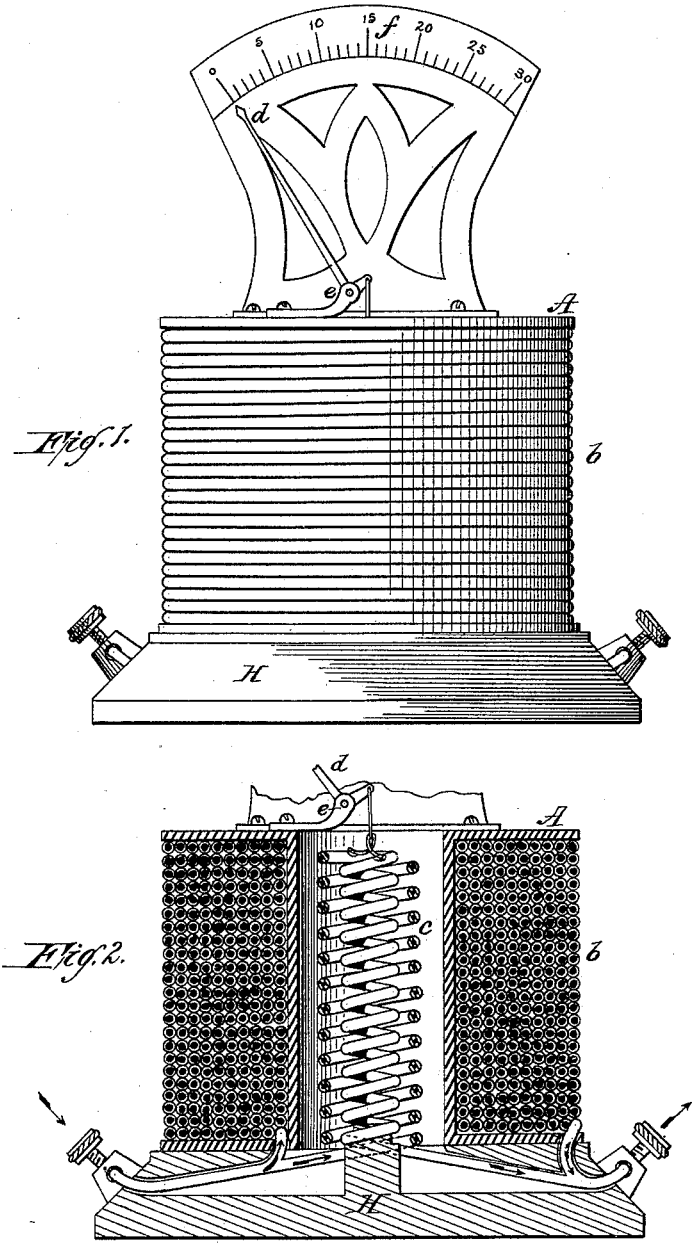
WITNESSES:
Arthur H. Eddy, INVENTOR,
BY
McTighe & Worthington,
ATTORNEYS.

UNITED STATES PATENT OFFICE.

ARTHUR H. EDDY, OF HARTFORD, CONNECTICUT.

ELECTRIC MEASURING INSTRUMENT.

SPECIFICATION forming part of Letters Patent No. 391,592, dated October 23, 1888.

Application filed December 20, 1887. Serial No. 258,517. (No model.)

*To all whom it may concern:*

Be it known that I, ARTHUR H. EDDY, a citizen of the United States, residing at Hartford, in the county of Hartford and State of Connecticut, have invented certain new and useful Improvements in Electric Measuring Instruments; and I do hereby declare the following to be a full, clear, and exact description of the invention, such as will enable others skilled in the art to which it appertains to make and use the same.

This invention relates to that class of electrical instruments which are more especially designed to directly indicate the strength of current flowing in any given circuit or the difference of potential in a circuit through which current is passing; and the invention consists in the construction and arrangement of devices, substantially as hereinafter fully described and claimed.

Instruments of this class are generally constructed with iron or steel as an element in their operation, and many sources of error exist, which tend to destroy precision, besides necessitating frequent calibration to determine the character of change which inevitably takes place from time to time in the permanent steel magnets employed. This difficulty has been to some extent avoided by using electro-magnets instead of permanent magnets; but there still remain the errors due to persistent or remanent magnetism of the iron used in construction. In consequence it is almost impossible to construct an instrument containing iron or steel in its working parts, which will give with a rising current the same reading as with a falling current. Attempts have been made to overcome this difficulty by using very small masses of magnetic metal in the construction; but this introduces a practical difficulty in obtaining readings, owing to the swaying of the index or pointer, which in such cases is not "dead beat."

My object is to construct a measuring-instrument entirely without iron or steel in its working parts, and in doing so I at once escape from all the difficulties above noted and produce an exceedingly simple and reliable instrument.

The invention is based upon the mutual attraction set up between the convolutions of a coil of wire by the passage of a current through the coil, so that a coil whose convolutions are free to move with the passage of current contracts in axial length, and the movement thus produced can be communicated to an index adapted to travel over a scale and the effect indicated directly in ampères or volts.

More particularly, my invention is as follows, reference being had to the accompanying drawings, in which—

Figure 1 is an elevation of an ammeter constructed in accordance with the principles of my invention; and Fig. 2 is a vertical section showing the interior.

The figures show the form in which I prefer to construct the ammeter.

A brass bobbin, A, is made with comparatively large bore, and is wound with insulated copper wire or band $b$ to suitable depth. In the interior I place a double spiral of wire, $c$, wound so that one spiral is inside the other, the winding being such that the current enters one spiral at the bottom or fixed end, ascends to the top, and then returns to the bottom through the other spiral, the direction of current being parallel throughout. The two spirals $c$ are at the upper or free end connected in any suitable manner with the index or pointer $d$, which is pivoted in bearing $e$ on the spool A and has its outer end moving in proximity to a scale, $f$, also attached to the spool-head. Obviously, when current is passing through the spirals $c$, the various convolutions will be mutually attracted, and the lower ends being fixed to the base H the mutual attraction causes a decided shortening of the axial length of the spirals $c$, which shortening movement causes movement of the pointer. The extent of movement of the pointer over the scale can be made greater by increasing the ratio between the arms of the lever system formed by the pivoted index $d$.

The relative movement of the spiral for given increments or decrements of current strength or potential will be proportional within certain limits; but as I prefer to set each instrument by the aid of a standard the nature of the law governing such proportionate movements is immaterial.

I still further increase the movement obtained by sending the current also through the external or field coils, b, in such direction as to make the total effect cumulative. The coil or spiral c must of course be selected with a view to a definite range or current capacity, and I prefer to keep far within the limits which might be placed by the modulus of elasticity of the metal employed and the heat produced by the current. To reduce the latter to the lowest possible degree, I prefer to so connect the coils b and c that they shall be in multiple arc, so that a comparatively small wire can be used for the latter and the number of convolutions made considerable.

Where the instrument is to be used for measuring differences of potential, the coils b and c will be of very small wire and of high resistance and coupled in series, or otherwise.

I desire to state that I do not limit myself to any particular mechanical means of communicating the movement of the coil c to the pointer, since such means may be greatly varied without departing from the spirit of my invention. Indeed, for some purposes, the reading could be taken direct from the contraction of the coil c without interposing any magnifying leverage whatever.

The mere matter of circuit pertains to the shop adjustment of the instrument, and will vary according to the purpose for which each instrument is intended to be adapted.

I claim as my invention—

1. An electric current or potential indicator comprising a spiral or helical conductor fixed at one end and having its convolutions free toward the other end, an index connected to the free end, and a scale in proximity to said index, substantially as described.

2. An electric current or potential indicator comprising one or more nested spiral or helical conductors fixed at one end and arranged to carry current in substantially parallel direction throughout, in combination with an index connected to the free end and a scale in proximity to said index, substantially as described.

3. An electric current or potential indicator comprising a spiral or helical conductor fixed at one end and having its convolutions free toward the other end, in combination with an index and scale and a field-of-force helix surrounding said spiral conductor and connected therewith in series or multiple arc, substantially as described.

4. The electric current or potential indicator consisting of the fixed helix b, internal coil c, in direct or derived circuit therewith, index d, pivoted in suitable bearing, e, and scale f, substantially as described.

In testimony whereof I affix my signature in presence of two witnesses.

ARTHUR H. EDDY.

Witnesses:
ARTHUR L. BRIGGS,
GEO. T. BRIGGS.